Patented July 24, 1951

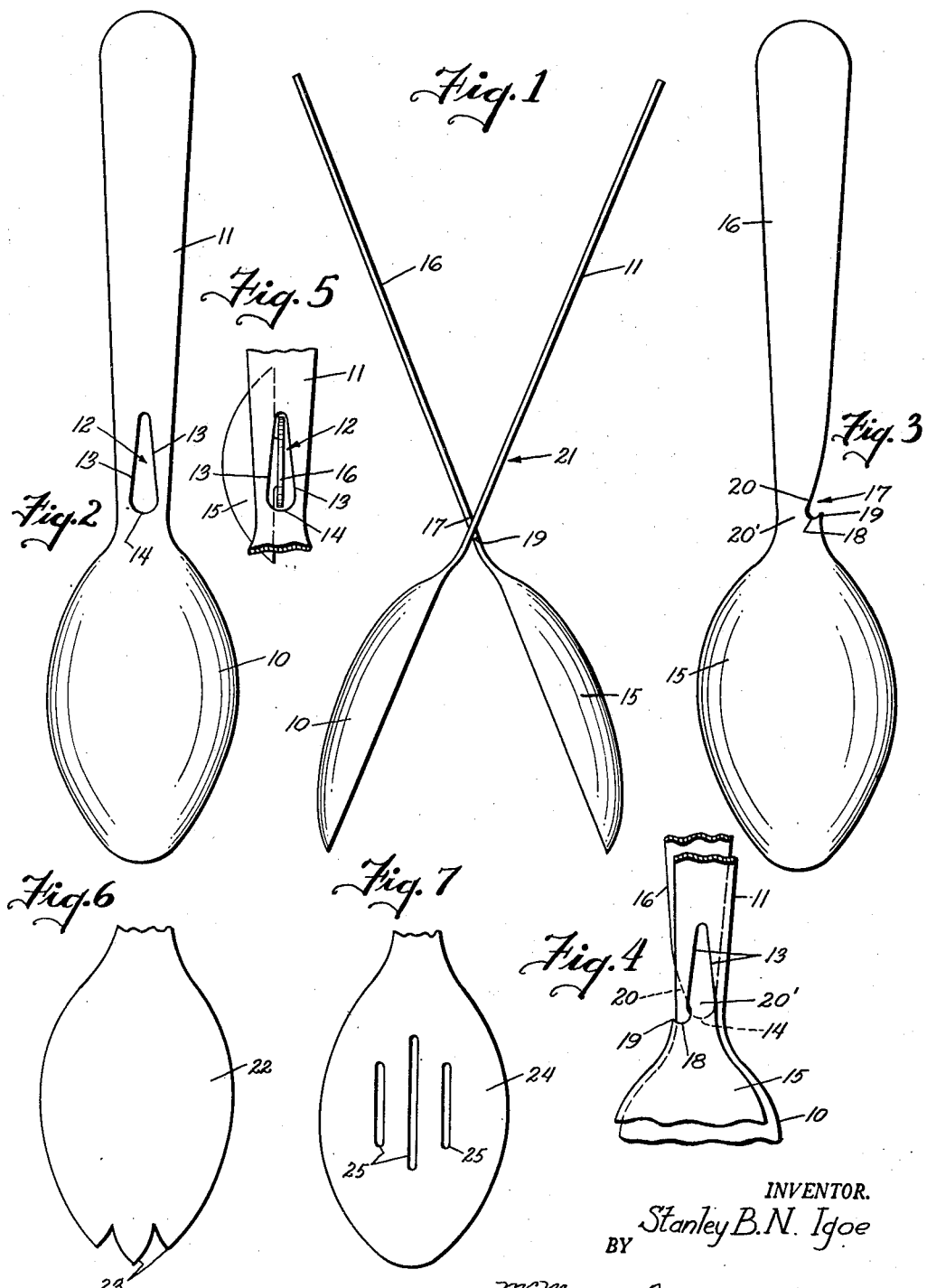

2,561,374

UNITED STATES PATENT OFFICE 2,561,374

KITCHEN SPOON TONGS

Stanley B. N. Igoe, San Juan, Puerto Rico

Application May 11, 1948, Serial No. 26,421

2 Claims. (Cl. 30—324)

My invention relates to lifting tongs for use in kitchens and the like.

An important object of the invention is to provide tongs in the form of readily-detachable spoons, constructed in such a manner that the spoons may be used individually, as spoons, when desired.

A further object is to provide a novel way to detachably connect the handles of a pair of spoons, so that they may serve as tongs, and so that one spoon handle may serve as a bottle opener.

A still further object is to provide a device of the above mentioned class which is simple, and quite inexpensive to manufacture.

Other objects and advantages of the invention will be apparent during the course of the following description.

In the accompanying drawings, forming a part of this application, and in which like numerals are employed to designate like parts throughout the same:

Figure 1 is a side elevation of assembled tongs embodying the invention.

Figure 2 is a side elevation of a spoon forming one side of the tongs, removed.

Figure 3 is a side elevation of a spoon forming the opposite side of the tongs, removed.

Figure 4 is a fragmentary side elevation of the assembled tongs of Figure 1, the view being taken at right angles to the view in Figure 1.

Figure 5 is a fragmentary elevational view, showing the method of assembling and disassembling the tongs.

Figure 6 is a fragmentary side elevation of a spoon embodying a slight modification of the invention, and, Figure 7 is a similar view of a further slight modification of the invention.

In the drawings, where for the purpose of illustration are shown preferred embodiments of the invention, attention is directed first to Figures 1 to 5, inclusive, wherein the numeral 10 designates a conventional kitchen mixing spoon or tong member, having the usual long straight handle 11. Near its lower end, the handle 11 is provided with a central elongated opening or slot 12, as shown. The opening 12 is substantially wider at its lower end than at its top, and forms upwardly converging edges 13. The lower end 14 of opening 12 is preferably rounded, as shown.

The numeral 15 designates an identical spoon or tong member, having a handle 16. Near its lower end, the handle 16 is provided in one side with a curved notch 17, forming a rounded lower end 18, terminating in an upwardly projecting point 19. The notch 17 further forms an inclined edge portion 20 which extends towards the transverse center of spoon handle 16, providing a narrow handle portion 20'.

When the spoons 10 and 15 are separated, as shown in Figures 2 and 3, they may be used like any conventional spoons. The spoon 15 may serve as a convenient bottle opener, through the use of the notch 17 in the usual manner.

The spoons 10 and 15 may be readily detachably connected and crossed to form convenient lifting tongs 21, Figure 1. To connect and cross the spoons 10 and 15, the handle 16 is merely inserted through the opening 12, which opening is slightly longer than the width of the handle 16. To accomplish this, the handles 11 and 16 are first arranged at substantially right angles, Figure 5. The handle 16 passes through opening 12, until the notch 17 enters the opening, to co-act with the opening to form a pivotal or hinged connection between the spoons, Figures 1 and 4. The notch bottom 18 and inclined edge 20 engages the rounded end 14 and one edge 13, Figure 4, and permits a natural pivotal action between the spoons. The converging edges 13 and the edge 20 prevent appreciable relative longitudinal movement of the pivotally connected spoons. The shapes of notch 17 and opening 12, as described are important, and afford a novel and practical way to detachably hinge the spoons 10 and 15 together to form the kitchen tongs 21. The round bottom end 14 makes it easy to swing the assembled spoon 15 to its position in Figure 5, for separating the spoons again. The tongs 21 may be used for a variety of purposes in the kitchen, as is well-known.

In Figure 6, I have shown a slightly modified spoon 22, provided at its end with prongs or teeth 23. This type of spoon is desirable for picking up certain types of food, such as salad. A pair of the spoons 22 are otherwise identical to the spoons 10 and 15, and are used in exactly the same manner.

In Figure 7, a spoon 24 is shown provided with drain slots 25. A pair of the spoons 24 are otherwise identical to spoons 10 and 15, and serve the same purposes. The slots 25 facilitate picking up boiled eggs, and the like, by permitting the liquid to drain off.

It is to be understood that the forms of the invention herewith shown and described are to be taken as preferred examples of the same, and that various changes in the shape, size and arrangement of parts may be resorted to, without departing from the spirit of the invention or the scope of the sub-joined claims.

Having thus described the invention, I claim:

1. Kitchen tongs comprising a first tong member including a handle and a spoon arranged adjacent one end of said handle and secured thereto, the handle of said first tong member being provided with a closed slot extending longitudinally of and spaced from the ends and sides of said handle, and a second tong member including a handle and a spoon arranged adjacent one end of said handle and secured thereto, the handle of said second tong member having a notch extending inwardly of one side intermediate the ends thereof, the handle of said second tong member being insertable through said slot in the handle of said first tong member with the portion adjacent said notch of the handle of said second tong member being freely rotatable in said slot to an extent such that the spoon of said second tong member faces the spoon of said first tong member, the notch of said second tong member being in engagement with the adjacent edge of said slot of said first tong member when the portion adjacent the notch of said second tong member has been rotated to an extent such that the spoon of said second tong member faces the spoon of said first tong member.

2. Kitchen tongs comprising a first tong member including a handle and a spoon arranged adjacent one end of said handle and secured thereto, the handle of said first tong member being provided with a closed slot extending longitudinally of and spaced from the ends and sides of said handle, and a second tong member including a handle and a spoon arranged adjacent one end of said handle and secured thereto, the handle of said second tong member having a notch extending inwardly of one side intermediate the ends thereof, said slot in the handle of said first tong member being of a length greater than the width of the handle of said second tong member and having its side edges converging toward one end of said slot, the handle of said second tong member being insertable through said slot in the handle of said first tong member with the portion adjacent said notch of the handle of said second tong member being freely rotatable in said slot to an extent such that the spoon of said second tong member faces the spoon of said first tong member, the notch of said second tong member embracingly receiving the adjacent edge of said slot of said first tong member when the portion adjacent the notch of said second tong member has been rotated to an extent such that the spoon of said second tong member faces the spoon of said first tong member.

STANLEY B. N. IGOE.

REFERENCES CITED

The following references are of record in the file of this patent:

UNITED STATES PATENTS

| Number | Name | Date |
|---|---|---|
| 19,419 | Haines | Feb. 23, 1858 |
| 1,522,067 | McBride | Jan. 6, 1925 |
| 1,643,456 | James | Sept. 27, 1927 |
| 2,010,074 | Fuerst | Aug. 6, 1935 |

FOREIGN PATENTS

| Number | Country | Date |
|---|---|---|
| 210,603 | Germany | June 8, 1909 |